June 11, 1963   J. O. PRICE ETAL   3,093,526
METHOD OF PLASTIC EDGE ATTACHMENT
Filed Feb. 7, 1961
FIG.-1
FIG.-2
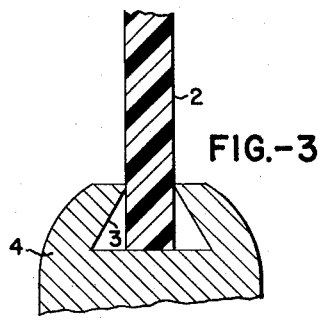
FIG.-3
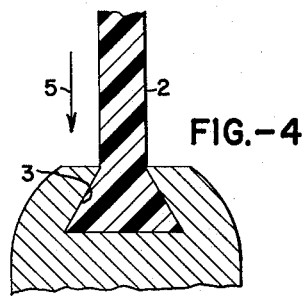
FIG.-4
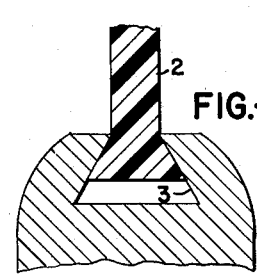
FIG.-5
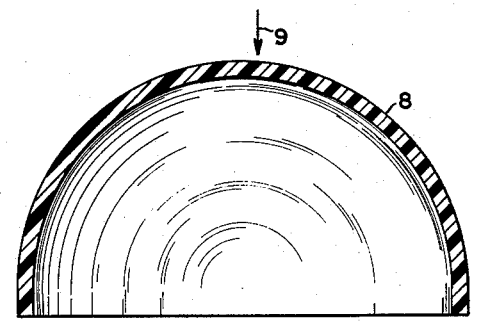
FIG.-6
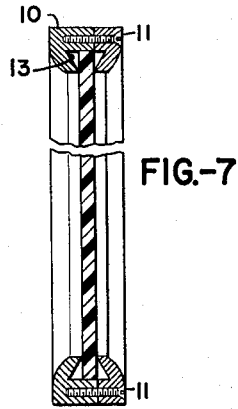
FIG.-7
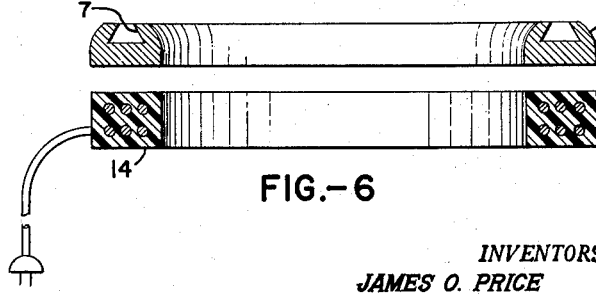
INVENTORS.
JAMES O. PRICE
BY FRANKLIN T. SMITH
ATTORNEY

United States Patent Office 3,093,526
Patented June 11, 1963

3,093,526
METHOD OF PLASTIC EDGE ATTACHMENT
James O. Price and Franklin T. Smith, Phoenix, Ariz., assignors to Goodyear Aircraft Corporation, Akron, Ohio, a corporation of Delaware
Filed Feb. 7, 1961, Ser. No. 87,707
2 Claims. (Cl. 156—85)

This invention relates to edge attachments for plastic materials, and, more particularly, is concerned with edge attachments for stretched plastic materials, for example, edge attachments used to secure plastic canopies, radomes, and the like in position.

Heretofore various edge attachments have been proposed for canopies and the like, but these are often relatively complicated, space-consuming, heavy, or expensive, and they have usually been designed for plastic materials which have not been highly stretched. In more recent years canopies, radomes, and the like have been made from stretched plastic materials for the reason that the stretching has been found to enhance the toughness of the plastic and reduce shattering or cracking thereof.

It is the general object of the invention to avoid and overcome the foregoing and other difficulties of and objections to prior art practices by the provision of a relatively simple inexpensive method for securing the edges of stretched plastic members to an edge attachment, the resulting combination being relatively light in weight, occupying a minimum of space, and yet being quite strong.

Another object of the invention is the provision of a method for securing the edge of a stretched plastic member to an elongated element formed with an undercut groove receiving the edge of the member, the edge of the member in the groove being heated to effect a plastic recovery and thickening of the edge to at least partially fill the undercut groove with the thickened plastic edge to thereby effect the securing of the plastic member to the elongated element.

The foregoing objects of the invention, and other objects which will become apparent as the description proceeds, are achieved by the method of securing an edge of a stretched plastic member to an elongated element which includes the steps of providing an undercut groove in the elongated element, positioning the edge of the member in the groove, and heating the edge of the member in the groove to effect a plastic recovery and thickening of the edge of the member to at least partially fill the undercut portion of the groove.

For a better understanding of the invention reference should be had to the accompanying drawings wherein FIG. 1 is a fragmentary cross-sectional view of an unstretched plastic member;

FIG. 2 is a view of the member of FIG. 1 but after it has been stretched;

FIG. 3 is a cross-sectional view illustrating the edge of the stretched plastic member positioned in an undercut groove formed in an edging element;

FIG. 4 is a view similar to FIG. 3 showing how the edge of the plastic member thickens upon heating to fill the undercut groove in the edging element;

FIG. 5 is a view similar to FIG. 4 but showing how the thickened edge of the plastic member may only partially fill the undercut groove when there is no feeding in of the edge as the plastic thickens;

FIG. 6 illustrates the manner of securing a complete canopy to an edging frame having a laterally directed groove receiving the canopy edge; and FIG. 7 shows the manner of securing a stretched plastic member in an endless frame having an inwardly directed groove receiving the plastic edge.

In the drawings, the numeral 1 indicates an unstretched sheet of plastic material to be employed in making a canopy, a radome, a window, or the like. This plastic material is of the type which can be heated to a softened condition followed by the stretching of the plastic in its own plane and in all directions to increase the area of the plastic, for example to 400% of its previous area, which means that the plastic is linearly stretched in all directions to, for example, twice its original length and twice its original width. A typical apparatus to perform this stretching operation is disclosed in U.S. Patent No. 2,912,716.

The resulting stretched plastic structure is indicated by the numeral 2 in FIG. 2. Upon being stretched the plastic reduces in thickness in the manner shown, and the plastic is then cooled or frozen in its stretched condition. The stretched plastic member 2 has been found to have improved physical properties being more resistant to shattering and cracking, and generally tougher, when formed into canopies and the like. Typical of plastics which are stretched to improve the physical properties is methyl methacrylate.

The stretched plastic member 2 is of the type having a plastic memory, and by this is meant the characteristic that should the plastic member 2 be reheated to about the stretching temperature it will return to its original form. This characteristic of plastic memory, or plastic recovery, is utilized in the present invention to effect the edge attaching action, in a manner which will now be described.

Having reference to FIG. 3 the edge of the plastic member 2 is inserted in an undercut groove 3 formed in an elongated element or frame 4, typically of metal. Now the edge of the plastic member 2 is heated to a temperature and for a length of time to cause the edge to recover plastically and to thicken and to partially or completely fill the groove 3.

FIG. 4 shows that in one embodiment of the invention as the edge of the plastic 2 begins to thicken under the application of heat the edge of the plastic is pressed inwardly into the groove 3 in the direction of the arrow 5 so that as the thickening of the edge progresses it substantially fills the groove 3.

Another embodiment of the invention is illustrated in FIG. 5 wherein there is no inward feeding movement into the groove 3 as the edge of the plastic member 2 thickens, so that as the edge of the plastic recovers and thickens it only partially fills the groove 3.

FIG. 6 more specifically illustrates a typical embodiment of the invention wherein the edge of the plastic member 2 is moved into the groove in the frame as the edges thicken. In this figure of the drawings the numeral 6 indicates a frame, usually of metal, and often endless, and having a laterally or upwardly opening undercut groove 7 therein. Groove 7 receives the edge of a stretched plastic canopy 8, and FIG. 6 shows the combination just as the canopy edge is being inserted into the groove 7 of the frame 6.

Now the edge of the canopy is heated, as heretofore and hereinafter described, and as it begins to recover plastically and to thicken pressure is directed against the canopy in the direction shown by the arrow 9 to force the edge of the canopy into the groove 7 to substantially completely fill it, in the manner shown in FIG. 4, followed by the cooling of the canopy edge to effect the securing of the canopy 8 in the frame 6.

FIG. 7 illustrates the embodiment of the invention shown in FIG. 5, and in FIG. 7 a frame member 10 is provided which is typically endless and which is formed of two parts held together by screws 11. The frame parts 10 are taken apart and the edges of a sheet of stretched plastic 12 is inserted in an inwardly directed groove 13 formed between the frame parts. The frame parts are now reassembled and are secured by the screws to hold the edge of the plastic sheet 12 in the groove 13. Then the edges of the plastic sheet 12 are heated to effect the plastic recovery and thickening thereof. But there can be no movement of the plastic sheet edges into the groove in this form of the invention so that the thickened edges only partially fill the undercut groove 13, all in the manner shown in FIG. 5.

In the practice of the invention it will be understood that in some instances it may be advisable to effect the thickening and molding of the edge or edges of the plastic sheet in a mold member provided for this purpose, followed by the removal of the plastic sheet from the mold after cooling, with the sheet then being mounted in the elongated element or frame member which can be made of several parts to effect the clamping of the element or frame around the enlarged edge of the plastic member.

The details for heating the edge of the plastic member to effect the plastic recovery and thickening form no part of the present invention in detail. However, it is here noted that the heating of the plastic edge is most effectively accomplished by heating the elongated element or frame member receiving the plastic edge, and this heating can be accomplished by the application of electric heating units against the element or frame, the electric resistance heating of the element or frame itself, or the like. Thus, in FIG. 6 is illustrated an electric heating element 14 which is adapted to be placed against the underside of the frame 6 to effect the heating of the frame and through it the heating of the edge of the plastic canopy 8 to thereby effect the joint shown in FIG. 4. Of course, after the heating and thickening of the plastic edge the heating element 14 is removed and the plastic edge and frame is cooled to complete the setting up or freezing of the softened plastic edge and the secure attachment thereof to the frame.

While a certain representative embodiment and details have been shown for the purpose of illustrating the invention, it will be apparent to those skilled in this art that various changes and modifications may be made therein without departing from the spirit or scope of the invention.

What is claimed is:

1. That method of securing a stretched plastic canopy in an endless frame which includes the steps of providing a laterally directed endless undercut groove in the frame of a width to slidably receive the edge of the canopy, slidably positioning the edge of the canopy in the groove, heating only the canopy edge to effect plastic recovery and thickening thereof, and simultaneously applying pressure to the canopy tending to slidably move the edge into the groove so that as the edge thickens it substantially fills the undercut groove.

2. That method of securing an edge of a stretched sheet of plastic material to an elongated frame-like element leaving the main body of the sheet exposed and out of engagement with the element which includes the steps of undercutting an elongated groove in the elongated element, positioning the entire edge of the sheet of plastic material in the groove so that the edge abuts the bottom of the groove, heating the entire edge of the sheet of plastic material but only the edge of the sheet to effect plastic recovery and thickening of only the edge of the sheet thereof, and simultaneously applying pressure to the plastic material to move the entire sheet towards the element to move the edge into the groove so that as the edge thickens it substantially fills the elongated undercut groove.

References Cited in the file of this patent
UNITED STATES PATENTS

| | | |
|---|---|---|
| 2,169,177 | Sunback | Aug. 8, 1939 |
| 2,252,504 | Hahn | Aug. 12, 1941 |
| 2,458,152 | Eakins | Jan. 4, 1949 |
| 2,886,481 | Swan | May 12, 1959 |
| 2,979,113 | Stageberg | Apr. 11, 1961 |
| 2,992,457 | Harrison | July 18, 1961 |
| 2,994,361 | Gable | Aug. 1, 1961 |